L. W. CHUBB.
METHOD OF AND APPARATUS FOR COATING WIRES.
APPLICATION FILED JAN. 26, 1910.

1,068,411.

Patented July 29, 1913.

WITNESSES:
Fred H. Miller

INVENTOR
Lewis W. Chubb
BY
Finley G. Carr
ATTORNEY

UNITED STATES PATENT OFFICE.

LEWIS W. CHUBB, OF WILKINSBURG, PENNSYLVANIA, ASSIGNOR TO WESTINGHOUSE ELECTRIC AND MANUFACTURING COMPANY, A CORPORATION OF PENNSYLVANIA.

METHOD OF AND APPARATUS FOR COATING WIRES.

1,068,411.  Specification of Letters Patent.  Patented July 29, 1913.

Application filed January 26, 1910.  Serial No. 540,219.

*To all whom it may concern:*

Be it known that I, LEWIS W. CHUBB, a citizen of the United States, and a resident of Wilkinsburg, in the county of Allegheny and State of Pennsylvania, have invented a new and useful Improvement in Methods of and Apparatus for Coating Wires, of which the following is a specification.

My invention relates to methods of and apparatus for treating conducting wires and cables in order to produce insulating coatings thereon.

The object of my invention is to provide a simple and effective method and apparatus of the class indicated above for treating a conducting wire at a rapid rate.

In my co-pending application, Serial No. 380,708, I have shown and described apparatus for treating aluminum wire for the purpose of obtaining an oxid or similar coating on its surface. According to this arrangement, the wire to be treated, is passed through a series of suitable baths which are contained in tanks or trays, the wire being guided into and out of the tanks over pulleys or rollers.

According to my present invention, I provide means for avoiding the necessity for guiding the wire into and out of the tanks over pulleys or rollers or similar devices. By this means the speed at which the apparatus may be operated, and the amount of wire which may be treated in a given length of time is materially increased.

Figure 1:
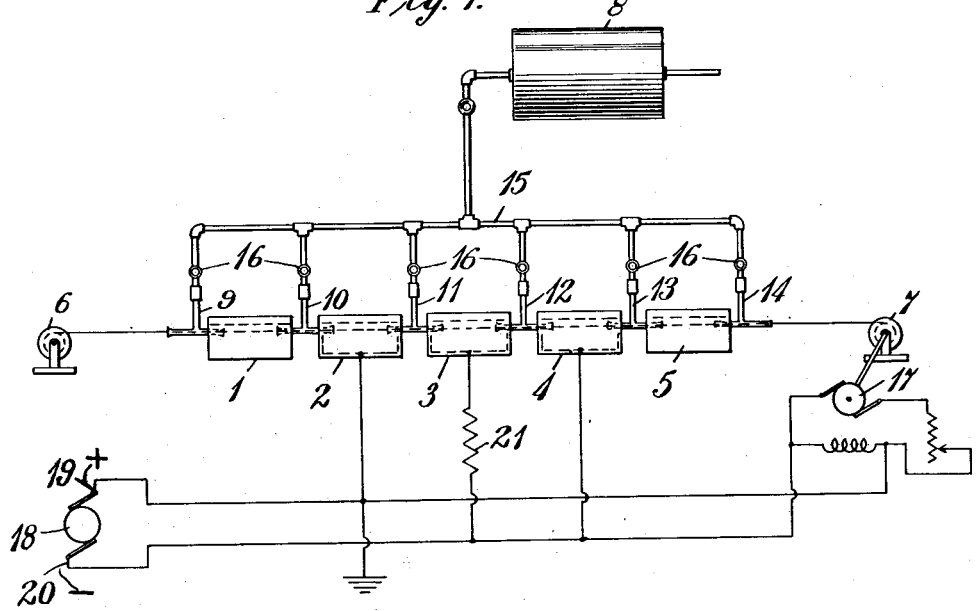
Figure 2:
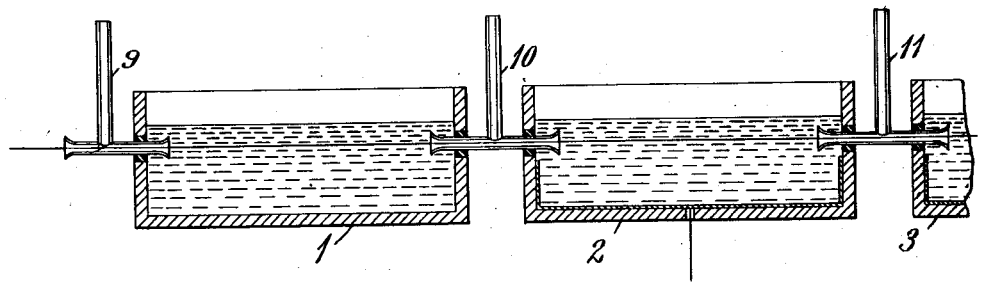

Figure 1 of the accompanying drawings is a diagrammatic view of a system embodying my invention, and Fig. 2 is a sectional elevation of a portion of the apparatus shown in Fig. 1.

Referring to the drawings, the apparatus here shown comprises a plurality of tanks, 1, 2, 3, 4 and 5, in which suitable liquids are contained, as hereinafter pointed out, a supply reel 6, a gathering reel 7 and a tank or reservoir 8 in which compressed air is contained. The tanks 1 to 5 inclusive, are disposed, substantially in alinement with each other, between the reels 6 and 7, so that a conductor may pass directly from one reel to the other through suitable openings which are provided in the sides of the tanks for that purpose. In order to permit a conductor to pass through the liquid in each tank and to prevent, at the same time, the liquid from flowing out of the openings through which the conductor passes, I have provided a plurality of T shaped pipe connections 9, 10, 11, 12, 13 and 14 of glass or other suitable insulating material, which are sealed into the tank openings, the T shaped connections 9 and 14 being located at the ends of the series of tanks, and the connections 10, 11, 12 and 13 being located between tanks, as shown in Fig. 1. The arrangement of parts is such that a straight passage through the tanks is provided for the conductor and, in order to prevent the liquid in the tanks 1 and 5 from escaping through the tubes, and the liquids in the adjacent tanks from becoming mixed, air pressure is introduced to the connections from the tank or storage reservoir 8, through a distributing pipe 15, and a plurality of regulating valves 16.

The gathering reel 7 is driven by an electric motor 17 which may be replaced by any other suitable driving means, and electrical energy is supplied to the linings of the tanks 2, 3 and 4 from a generator 18 or from any other suitable source of electrical energy.

The operation of, and the electric circuit connections for, the system are as follows: Assuming that the conductor has been threaded from the supply reel 6, through the connections 9 to 14 inclusive, and connected to the gathering reel 7, if the valves 16 are regulated to admit compressed air to the connections 9 to 14, the tanks 1 to 5 may be filled with suitable liquids for producing an oxid or similar coating on the conductors as it passes through them. The tank 1 preferably contains a potassium hydroxid solution, and the tanks 2, 3 and 4 are preferably filled with a sodium silicate solution, and the tank 5 is preferably filled with hot water.

The tank 2 is provided with a lining of conducting material, as shown in Fig. 2 of the drawings, which constitutes an electrode and is connected to one terminal 19 of the generator 18. This terminal of the generator is preferably grounded in order to minimize the danger to attendants and is the positive terminal of the system. The lining of the tank 3 is connected to the opposite terminal 20 of the generator 18 through a resistance 21, and the lining of the tank 4 is connected directly to the terminal 20.

From the foregoing it is evident that, if the conductor which passes through the tanks is grounded, the greatest difference of potential between the conductor and the bath exists at the tank 4, an intermediate voltage being impressed upon the fluid in the tank 3, and the tank 2 constituting a simple means for supplying current to the conductor.

The electromotive force which is impressed upon the above named circuit by the generator 18 is opposed, to a greater or less degree, by the electrolyte or by a counter-electromotive force or tension generated in it. It is apparent that the current supplied to the conductor undergoing treatment must be under such pressure or tension as will insure its flow to and through the conductor and from the conductor to and through the electrolyte. It is immaterial—so far as the process and its result are concerned—whether the current flow is opposed by the ohmic resistance of the electrolyte and that of such coating as the conductor may have at the place where the current passes from it to the electrolyte, or whether it is opposed by a counter-pressure or tension generated in the electrolyte. It is to be understood, therefore, that the words "counter tension" are employed to designate such resistance as may oppose the flow of current from the conductor undergoing treatment to and through the electrolyte in which it is submerged.

The tank 1 may be omitted but is preferably employed for cleaning the conductor and preparing it for the action of the other baths.

The electrolytic action which takes place as the conductor passes through the baths and as the electric current traverses the conductor and the baths, serves to produce an oxid or similar film or coating on the surface of the conductor which is capable of sustaining a material voltage and may be depended upon in lieu of the insulating coverings with which electric conductors are usually provided.

As soon as all of the baths are in condition, the electric circuits above described are completed and the electric motor 17 is operated to drive the gathering reel 7 and to draw the conductor through the tanks. This process may be continued until all of the wire on the reel 6 is exhausted and the gathering reel may be operated at a rapid rate without interfering with the effective treatment of the conductor.

The hot water in tank 5 removes all trace of the sodium silicate solution which may be carried over from the preceding bath, and the air flowing through the connection 14 assists in evaporating the hot water as the wire passes out so that it is wound upon the reel 7 in perfect condition and free from moisture.

It is evident that structural modifications may be effected in the system illustrated, without departing from the spirit of my invention, and I desire that only such limitations shall be imposed as are indicated in the appended claims.

I claim as my invention:

1. In a wire-coating apparatus, the combination with a series of liquid-containing tanks having alined openings in their sides, of conduit connections between adjacent sides of adjacent tanks below the liquid level for the passage of the wire to be treated and of materially greater diameter than such wire.

2. In a wire-coating apparatus, the combination with a series of liquid-containing tanks having similarly located orifices in their opposite walls, of T shaped pipe connections disposed between the orifices of adjacent tanks, to provide a continuous conduit through the tanks below the liquid level for the passage of the wire to be treated and of materially greater diameter than such wire.

3. In a wire-coating apparatus, the combination with a series of liquid-containing tanks having similarly located orifices in their opposite walls, of T shaped pipe connections disposed between tanks and projecting through adjacent orifices, and means for supplying a gas under pressure to each of the T connections.

4. In a wire-coating apparatus, the combination with a series of liquid-containing tanks having similarly located orifices in their opposite walls, of T shaped pipe connections disposed between tanks and projecting through adjacent orifices, and means for supplying a gas under pressure to each of the T connections, whereby a continuous passage is provided through the tanks and the pipe connections below the liquid level and mingling of the liquids in the several tanks is prevented.

5. In a system for treating wires and cables, the combination with a series of liquid-containing tanks having a plurality of orifices in alinement below the liquid level through which the wire or cable to be treated may be continuously passed, and means for preventing the liquid in each tank from escaping and from mingling with that of the other tanks without interfering with the progress of the wire.

6. In a system for treating wires and cables, the combination with a series of liquid-containing tanks having a plurality of orifices in alinement below the liquid level, and T shaped pipe connections of insulating material extending into the orifices in the walls of the tanks, of means for continuously passing a wire or cable through the pipe connections and the tanks, and means for preventing the liquid in each tank from escaping and from mingling with those of the adjacent tanks.

7. In a system for treating wires and cables, the combination with a series of liquid-containing tanks having a plurality of orifices in alinement below the liquid level, and T shaped pipe connections of insulating material, extending into the orifices in the walls of the tanks, of means for continuously passing a wire or cable through the pipe connections and the tanks, and means for supplying gas under pressure to the several pipe connections for preventing the liquid in each tank from escaping and from mingling with those of the adjacent tanks.

8. The method of insulating wire of aluminum and the like, which consists in passing the wire through an electrolyte while protecting it from contact with solid bodies and at the same time conducting through the wire and the electrolyte an electric current of a tension greater than the counter tension generated in the electrolyte on the surface of the wire, so as to produce an insulating coat on the wire.

9. The method of insulating wire of aluminum and the like, which consists in passing the wire first through a cleaning medium and then through an electrolyte while protecting it from contact with solid bodies and at the same time sending through the wire and the electrolyte an electric current of a tension greater than the counter tension generated in the electrolyte on the surface of the wire, so as to produce an insulating coat on the wire.

10. The method of forming an insulating coating upon a wire which consists in moving the wire progressively through an electrolyte, while maintaining the same free from contact with any solid body, and simultaneously subjecting a submerged portion of said wire to an electric current that flows into and through it and thence through the electrolyte.

In testimony whereof, I have hereunto subscribed my name this 19th day of Jan., 1910.

LEWIS W. CHUBB.

Witnesses:
  L. M. KLAUBER,
  B. B. HINES.